(12) United States Patent
Lee et al.

(10) Patent No.: US 11,936,321 B2
(45) Date of Patent: Mar. 19, 2024

(54) APPARATUS FOR SUPPRESSING TORQUE GENERATION OF THREE-PHASE MOTOR AND METHOD THEREOF

(71) Applicants: Hyundai Motor Company, Seoul (KR); Kia Corporation, Seoul (KR)

(72) Inventors: Yong Jae Lee, Whasung-Si (KR); Jung Hwi Kim, Whasung-Si (KR); Hyun Jae Lim, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/743,163

(22) Filed: May 12, 2022

(65) Prior Publication Data

US 2023/0023574 A1    Jan. 26, 2023

(30) Foreign Application Priority Data

Jul. 15, 2021    (KR) .......................... 10-2021-0093151

(51) Int. Cl.
| | | |
|---|---|---|
| *H02P 27/04* | (2016.01) | |
| *H02P 3/02* | (2006.01) | |
| *H02P 3/18* | (2006.01) | |
| *H02P 6/24* | (2006.01) | |

(52) U.S. Cl.
CPC ................ *H02P 3/025* (2013.01); *H02P 3/18* (2013.01); *H02P 6/24* (2013.01)

(58) Field of Classification Search
CPC .... H02P 3/025; H02P 3/18; H02P 6/24; H02P 23/14; H02P 21/20; H02P 21/05; H02P 21/0003; H02P 27/06; Y02T 10/64
See application file for complete search history.

(56) References Cited

U.S. PATENT DOCUMENTS

2022/0176940 A1    6/2022    Kim

FOREIGN PATENT DOCUMENTS

| JP | 2018102077 A | * | 6/2018 | .............. B60L 15/20 |
|---|---|---|---|---|
| KR | 10-2022-0079287 A | | 6/2022 | |

\* cited by examiner

*Primary Examiner* — Karen Masih

(74) *Attorney, Agent, or Firm* — MORGAN, LEWIS & BOCKIUS LLP

(57) ABSTRACT

An apparatus and method for suppressing torque generation of a three-phase motor, includes a torque determination device that determines a second torque value for suppressing a first torque value due to a zero phase sequence component current of the three-phase motor, a control amount determination device that determines a voltage control amount for generating the determined second torque value, and a controller that is configured to control the three-phase motor according to the determined voltage control amount.

18 Claims, 4 Drawing Sheets

APPARATUS FOR SUPPRESSING TORQUE GENERATION OF THREE-PHASE MOTOR AND METHOD THEREOF

CROSS-REFERENCE TO RELATED APPLICATION

The present application claims priority to Korean Patent Application No. 10-2021-0093151, filed on Jul. 15, 2021, the entire contents of which is incorporated herein for all purposes by this reference.

BACKGROUND OF THE INVENTION

Field of the Invention

The present disclosure relates to an apparatus and method for suppressing torque generation of a three-phase motor.

Description of Related art

In general, a vehicle such as an electric vehicle, a hybrid car, or a plug-in hybrid vehicle may be driven based on a three-phase motor. Furthermore, such a vehicle may charge a battery thereof while being driven with a three-phase motor to increase battery efficiency. However, when an unintentional current flows through the three-phase motor to charge the battery, torque is induced, reducing the efficiency of power transmission and causing the vehicle to move unintentionally.

Furthermore, in general, the above-mentioned unintended current may be a current based on a zero phase sequence component current of a three-phase motor. Therefore, there is a need to provide a method for controlling torque by a zero phase sequence component current of a three-phase motor.

The information included in this Background of the Invention section is only for enhancement of understanding of the general background of the invention and may not be taken as an acknowledgment or any form of suggestion that this information forms the prior art already known to a person skilled in the art.

BRIEF SUMMARY

Various aspects of the present disclosure are directed to providing an apparatus or method configured for suppressing unintended torque induced in a three-phase motor.

Furthermore, another aspect of the present disclosure provides an apparatus or method configured for suppressing torque due to a zero phase sequence component current of a three-phase motor.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus of suppressing torque generation of a three-phase motor includes a torque determination device that determines a second torque value for suppressing a first torque value due to a zero phase sequence component current of the three-phase motor, a control amount determination device that determines a voltage control amount for generating the determined second torque value, and a controller that is configured to control the three-phase motor according to the determined voltage control amount.

According to an exemplary embodiment of the present disclosure, the torque determination device may determine a zero phase sequence component current value based on a current three-phase current value of the three-phase motor, determine the first torque value due to the zero phase sequence component current based on the determined zero phase sequence component current value, and determine the second torque value for suppressing the first torque value based on the determined first torque value.

According to an exemplary embodiment of the present disclosure, the zero phase sequence component current value may be expressed based on a d-q axis, and the zero phase sequence component current value may include a d-axis zero phase sequence component current value and a q-axis zero phase sequence component current value.

According to an exemplary embodiment of the present disclosure, the control amount determination device may include a required current determination device that determines a required current value for generating the determined second torque value, a required voltage determination device that determines a required voltage value for generating the second torque value based on the determined required current value and the current three-phase current value, and the control amount determination device that determines the voltage control amount based on the determined required voltage value.

According to an exemplary embodiment of the present disclosure, the required current value and the required voltage value may be expressed based on a d-q axis. The required current value may include a d-axis required current value and a q-axis required current value. Furthermore, the required voltage value may include a d-axis required voltage value and a q-axis required voltage value.

According to an exemplary embodiment of the present disclosure, the current three-phase current value may be expressed based on the d-q axis. The required voltage value may represent a voltage value required for the three-phase motor so that the current three-phase current value is equal to the required current value.

According to an exemplary embodiment of the present disclosure, the voltage value required for the three-phase motor may be determined according to a proportional integral (PI) control scheme.

According to an exemplary embodiment of the present disclosure, the voltage control amount may represent a value based on the ratio of the required voltage value to a current three-phase voltage of the three-phase motor.

According to an exemplary embodiment of the present disclosure, the controller may include a voltage output device that outputs a driving voltage for generating the second torque value based on a current three-phase voltage of the three-phase motor and the voltage control amount.

According to an exemplary embodiment of the present disclosure, the controller may further include an inverter that drives the three-phase motor based on the output driving voltage.

According to another aspect of the present disclosure, a method of suppressing torque generation of a three-phase motor includes determining a second torque value for suppressing a first torque value due to a zero phase sequence component current of the three-phase motor, determining a voltage control amount for generating the determined second torque value, and controlling the three-phase motor according to the determined voltage control amount.

According to an exemplary embodiment of the present disclosure, the determining of the second torque value may include determining a zero phase sequence component current value based on a current three-phase current value of the three-phase motor, determining the first torque value due to the zero phase sequence component current based on the determined zero phase sequence component current value, and determining the second torque value for suppressing the first torque value based on the determined first torque value.

According to an exemplary embodiment of the present disclosure, the zero phase sequence component current value may be expressed based on a d-q axis, and the zero phase sequence component current value may include a d-axis zero phase sequence component current value and a q-axis zero phase sequence component current value.

According to an exemplary embodiment of the present disclosure, the determining of the voltage control amount may include determining a required current value for generating the determined second torque value, determining a required voltage value for generating the second torque value based on the determined required current value and the current three-phase current value, and determining the voltage control amount based on the determined required voltage value.

According to an exemplary embodiment of the present disclosure, the required current value and the required voltage value may be expressed based on a d-q axis. The required current value may include a d-axis required current value and a q-axis required current value. Furthermore, the required voltage value may include a d-axis required voltage value and a q-axis required voltage value.

According to an exemplary embodiment of the present disclosure, the current three-phase current value may be expressed based on the d-q axis, and the required voltage value may represent a voltage value required for the three-phase motor so that the current three-phase current value is equal to the required current value.

According to an exemplary embodiment of the present disclosure, the voltage value required for the three-phase motor may be determined according to a proportional integral (PI) control scheme.

According to an exemplary embodiment of the present disclosure, the voltage control amount may represent a value based on the ratio of the required voltage value to a current three-phase voltage of the three-phase motor.

According to an exemplary embodiment of the present disclosure, the controlling of the three-phase motor may include outputting a driving voltage for generating the second torque value based on a current three-phase voltage of the three-phase motor and the voltage control amount.

According to an exemplary embodiment of the present disclosure, the controlling of the three-phase motor may further include driving the three-phase motor based on the output driving voltage.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
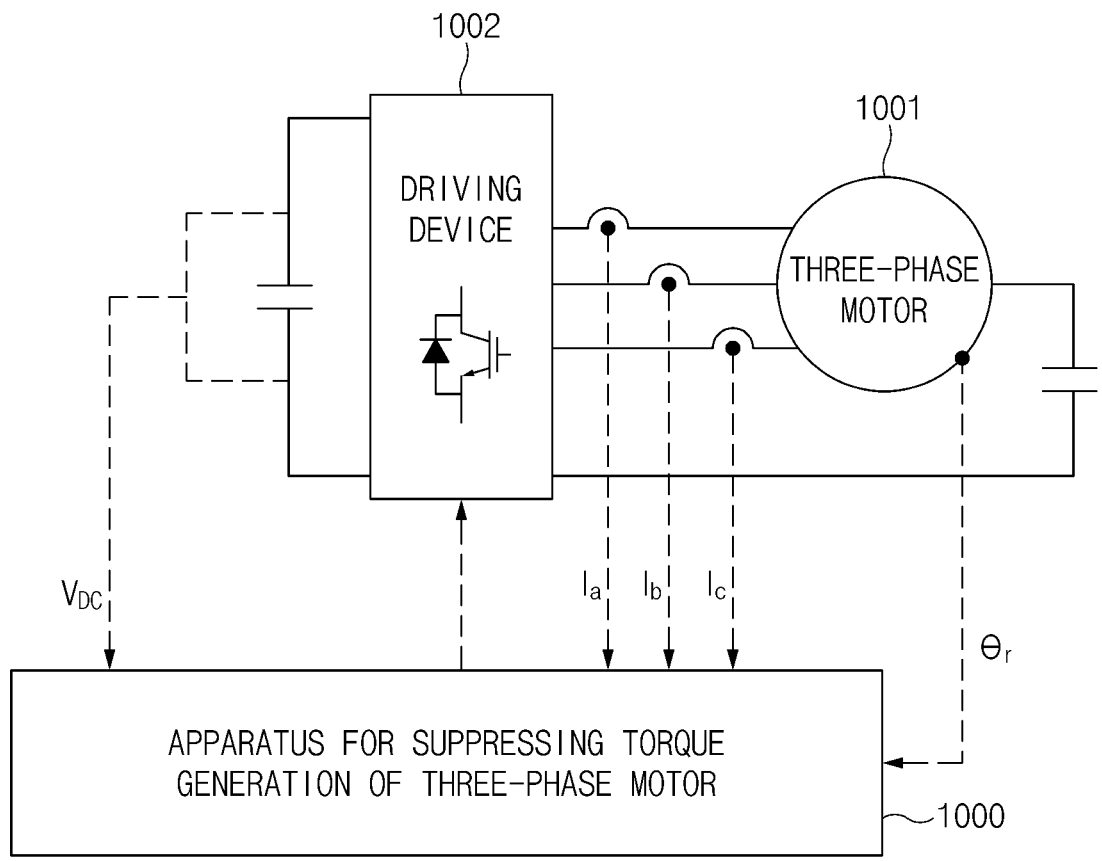
FIG. 1 is a view exemplarily illustrating an example of an apparatus of suppressing torque generation of a three-phase motor according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it may be noted that the identical or equivalent component is designated by the identical numeral even when they are displayed on other drawings. Furthermore, in describing an exemplary embodiment of the present disclosure, a detailed description of the related known configuration or function will be omitted when it is determined that it interferes with the understanding of an exemplary embodiment of the present disclosure.

In describing the components of an exemplary embodiment of the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which the present disclosure belongs. It will be further understood that terms, such as those defined in commonly used dictionaries, may be interpreted as having a meaning which is consistent with their meaning in the context of the relevant art and will not be interpreted in an idealized or overly formal sense unless so defined herein.

Hereinafter, various embodiments of the present disclosure will be described in detail with reference to FIG. 1, FIG. 2, FIG. 3, and FIG. 4.

FIG. 1 is a view exemplarily illustrating an example of an apparatus of suppressing torque generation of a three-phase motor according to an exemplary embodiment of the present disclosure.

FIG. 1 illustrates an example of an apparatus (or device) 1000 for suppressing torque generation of a three-phase motor (or motor) according to various exemplary embodiments of the present disclosure.

A three-phase motor according to an exemplary embodiment of the present disclosure may be driven based on a vehicle battery included in a vehicle. For example, the direct current (DC) voltage of the battery may be converted into an alternating current (AC) voltage through an inverter and transmitted to the three-phase motor.

Furthermore, in an exemplary embodiment of the present disclosure, a vehicle battery included in a vehicle may be charged based on electric vehicle supply equipment (EVSE). An inverter and/or a three-phase motor according to an exemplary embodiment of the present disclosure may boost the voltage of the EVSE when charging the battery based on the EVSE. For example, the EVSE performs charging based on 400 V and/or 800 V. When the EVSE performs charging based on 400 V, the inverter and/or the three-phase motor described above may boost the voltage. That is, the inverter and/or the three-phase motor according to an exemplary embodiment of the present disclosure may operate as a boost converter that boosts the voltage when the vehicle battery is charged.

A three-phase motor according to an exemplary embodiment of the present disclosure may be included in a vehicle to drive the vehicle. A vehicle according to an exemplary embodiment of the present disclosure may include at least one of an electric vehicle (EV), a hybrid electric vehicle (HEV), and/or a plug-in hybrid electric vehicle (PHEV). The three-phase motor according to an exemplary embodiment of the present disclosure may charge the battery of the vehicle while driving the vehicle. That is, when power is applied from the battery, the three-phase motor may drive the vehicle and simultaneously generate a current to charge the battery again. However, when a current flows through the three-phase motor, an unintended torque is generated, which not only reduces the efficiency of power transmission but also moves the vehicle.

According to an exemplary embodiment of the present disclosure, the above-described unintended torque may be generated due to a zero phase sequence component current of the three-phase motor. The zero phase sequence component current may mean a current without a phase sequence. The apparatus according to an exemplary embodiment of the present disclosure may suppress the torque generation due to the zero phase sequence component current. For example, the apparatus may additionally generate a torque configured for offsetting the torque caused by the zero phase sequence component current, solving the above-described problems.

The apparatus of suppressing torque generation of a three-phase motor according to an exemplary embodiment of the present disclosure may be connected to a three-phase motor 1001 and/or a driving device 1002. The driving device in the present figure may represent the above-described inverter. Furthermore, the driving device in the present figure may be referred to as an inverter. The apparatus, the three-phase motor, and the inverter according to various exemplary embodiments of the present disclosure may include each other. For example, an inverter may be included in the apparatus. An apparatus according to various exemplary embodiments of the present disclosure may further include one or more elements not shown in the present figure.

The description of the three-phase motor according to the exemplary embodiments of the present disclosure is the same as or similar to that described above. That is, the three-phase motor according to an exemplary embodiment of the present disclosure may drive the vehicle and may be included in the vehicle.

The inverter according to an exemplary embodiment of the present disclosure may generate a three-phase current Ia, Ib and/or Ic to drive a three-phase motor. A three-phase voltage $V_{DC}$ may be applied to the inverter according to an exemplary embodiment of the present disclosure. The inverter according to an exemplary embodiment of the present disclosure may generate a three-phase current based on a three-phase voltage. As described above, the inverter according to an exemplary embodiment of the present disclosure may be included in the apparatus.

The apparatus according to an exemplary embodiment of the present disclosure may suppress the unintentional torque generation of the three-phase motor as described above. For example, the apparatus may generate a voltage for additional torque generation configured for suppressing torque caused by the zero phase sequence component current and transmit the voltage the inverter, so that the inverter generates a current based on the received voltage to drive the three-phase motor. The voltage for generating the above-described additional torque may be referred to as a driving voltage.

The apparatus according to an exemplary embodiment of the present disclosure may suppress the unintentional torque generation of the three-phase motor through the scheme described in the present figure. Furthermore, the apparatus according to an exemplary embodiment of the present disclosure may determine and generate a voltage configured for suppressing the torque caused by the zero phase sequence component current in the three-phase motor to drive the three-phase motor. Thus, the apparatus may suppress the unintentional torque generation during the charging system using a motor, increasing the efficiency of the charging system.

Figure 2:
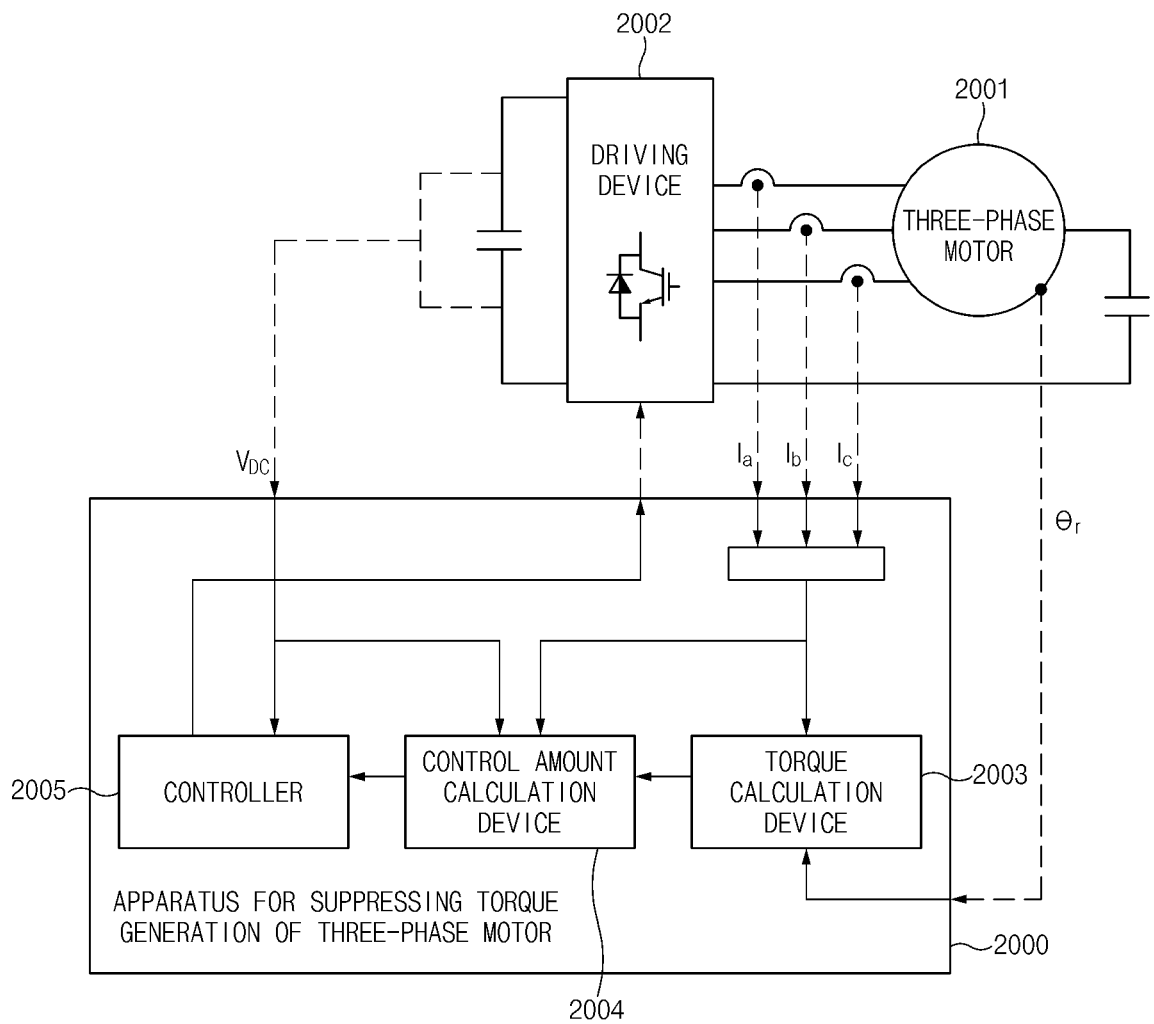
FIG. 2 is a view exemplarily illustrating an example of an apparatus of suppressing torque generation of a three-phase motor according to an exemplary embodiment of the present disclosure.

FIG. 2 is a view exemplarily illustrating an example of an apparatus of suppressing torque generation of a three-phase motor according to an exemplary embodiment of the present disclosure.

This figure illustrates an example of an apparatus 2000 (the above-described apparatus of FIG. 1) for suppressing torque generation of a three-phase motor according to an exemplary embodiment of the present disclosure.

As described above in FIG. 1, the apparatus 2000 according to an exemplary embodiment of the present disclosure may be connected to an inverter 2002 and/or a three-phase motor 2001. The apparatus according to an exemplary embodiment of the present disclosure may include a torque determination device 2003, a control amount determination device 2004, and/or a controller 2005. Furthermore, as described above in FIG. 1, the apparatus 2000 may include the inverter 2002.

The torque determination device according to an exemplary embodiment of the present disclosure may determine a second torque value for suppressing a first torque value due to the zero phase sequence component current of the three-phase motor. The first torque value due to the zero phase sequence component current according to an exemplary embodiment of the present disclosure may represent the unintended torque described above with reference to FIG. 1, that is, the torque due to the zero phase sequence component current. The second torque value according to an exemplary embodiment of the present disclosure may represent an additional torque (the additional torque described above with reference to FIG. 1) for suppressing the torque caused by the above-described zero phase sequence component current.

The torque determination device according to an exemplary embodiment of the present disclosure may determine a zero phase sequence component current value based on the current three-phase current Ia, Ib, and/or Ic of the three-phase motor. The zero phase sequence component current value according to an exemplary embodiment of the present disclosure may be expressed based on a d-q axis. The zero phase sequence component current value according to an exemplary embodiment of the present disclosure may include a d-axis zero phase sequence component current value Id^e, a q-axis zero phase sequence component current value Iq^e and/or an n-axis zero phase sequence component current value In^e. The zero phase sequence component current values Id^e, Iq^e and/or In^e according to an exemplary embodiment of the present disclosure may be determined as follows.

$$\begin{bmatrix} I_d^e \\ I_q^e \\ I_n^e \end{bmatrix} = \frac{2}{3} \begin{bmatrix} 1 & -1/2 & -1/2 \\ 0 & \sqrt{3}/2 & -\sqrt{3}/2 \\ 1/2 & 1/2 & 1/2 \end{bmatrix} \begin{bmatrix} I_a^s \\ I_b^s \\ I_c^s \end{bmatrix}$$ [Equation 1]

In Equation 1, Ia^s, Ib^s and Ic^s may represent a-phase current, b-phase current and c-phase current of the three-phase current according to an exemplary embodiment of the present disclosure, respectively. A scheme of determining the zero phase sequence component current value according to an exemplary embodiment of the present disclosure is not limited to the above-mentioned equation.

The torque determination device according to an exemplary embodiment of the present disclosure may determine the first torque value due to the zero phase sequence component current, based on the determined zero phase sequence component current value. As described above, the first torque value is an unintentionally generated torque value. When the first torque value is not generated, the torque value Te generated in the three-phase motor may be as follows.

$$T_e = \frac{3}{2}\frac{P}{2}[\lambda_f + (L_d - L_q)I_d^e]I_q^e$$ [Equation 2]

In Equation 2, λf represents the flux linkage of the three-phase motor, Ld represents the d-axis inductance of the three-phase motor, Lq represents the q-axis inductance of the three-phase motor, Id^e represents the d-axis current of the three-phase motor, and Iq^e may represent the q-axis current of the three-phase motor. When the first torque value according to an exemplary embodiment of the present disclosure is not generated, a scheme of determining the torque value Te generated in the three-phase motor is not limited to the above-described equation.

When the first torque value according to an exemplary embodiment of the present disclosure is generated, the torque value Te generated in the three-phase motor may be as follows.

$$T_e = \frac{3}{2}\frac{P}{2}[\lambda_f + (L_d - L_q)I_d^e]I_q^e + 3\lambda_n I_n^e \cos(3\theta_r + \delta_n)$$ [Equation 3]

In Equation 3, λf, Ld, Lq, Id^e, and Iq^e are the same as those described in Equation 2. In Equation 3, λn represents the zero phase sequence component flux of the three-phase motor, In^e represents the n-phase sequence component (e.g., zero phase sequence component) current value, θr represents the phase angle of the three-phase motor, and δn represents the phase of the torque by the zero phase sequence component current. When the first torque value according to an exemplary embodiment of the present disclosure is generated, a scheme of determining the torque value Te generated in the three-phase motor is not limited to the above-described equation.

That is, the torque determination device according to an exemplary embodiment of the present disclosure may determine the first torque value due to the zero phase sequence component current based on Equation 2 and Equation 3 described above. For example, the first torque value corresponds to a difference value between the torque value based on Equation 2 and the torque value based on Equation 3 described above.

The torque determination device according to an exemplary embodiment of the present disclosure may determine the second torque value Te* for suppressing the first torque value, based on the first torque value Te,n determined.

$$T_e^* = -T_{e,n}$$ [Equation 4]

In Equation 4, Te,n represents the first torque value described above. That is, the second torque value Te* according to an exemplary embodiment of the present disclosure may be a value corresponding to a negative value of the first torque value. A scheme of determining the second torque value according to an exemplary embodiment of the present disclosure is not limited to the above-described equation.

The control amount determination device according to an exemplary embodiment of the present disclosure may determine a voltage control amount for generating the determined second torque value. The voltage control amount according to an exemplary embodiment of the present disclosure may be a value for the current three-phase voltage (the three-phase voltage described above in FIG. 1) of the three-phase motor. For example, the voltage control amount is a value representing the ratio at which the current three-phase voltage may be changed to suppress unintended torque in the three-phase motor.

The controller according to an exemplary embodiment of the present disclosure may control the three-phase motor according to the determined voltage control amount. That is, the controller may re-generate the three-phase current based on the voltage control amount to re-drive the three-phase motor to suppress unintended torque.

The apparatus according to an exemplary embodiment of the present disclosure may suppress the unintentional torque generation in the three-phase motor through the scheme described in the present figure. Furthermore, the apparatus according to an exemplary embodiment of the present disclosure may determine and generate a voltage configured for suppressing the torque caused by the zero phase sequence component current in the three-phase motor, driving the three-phase motor. Thus, the apparatus may suppress unintentional torque generation in the charging system using the motor, increasing the efficiency of the charging system.

Figure 3:
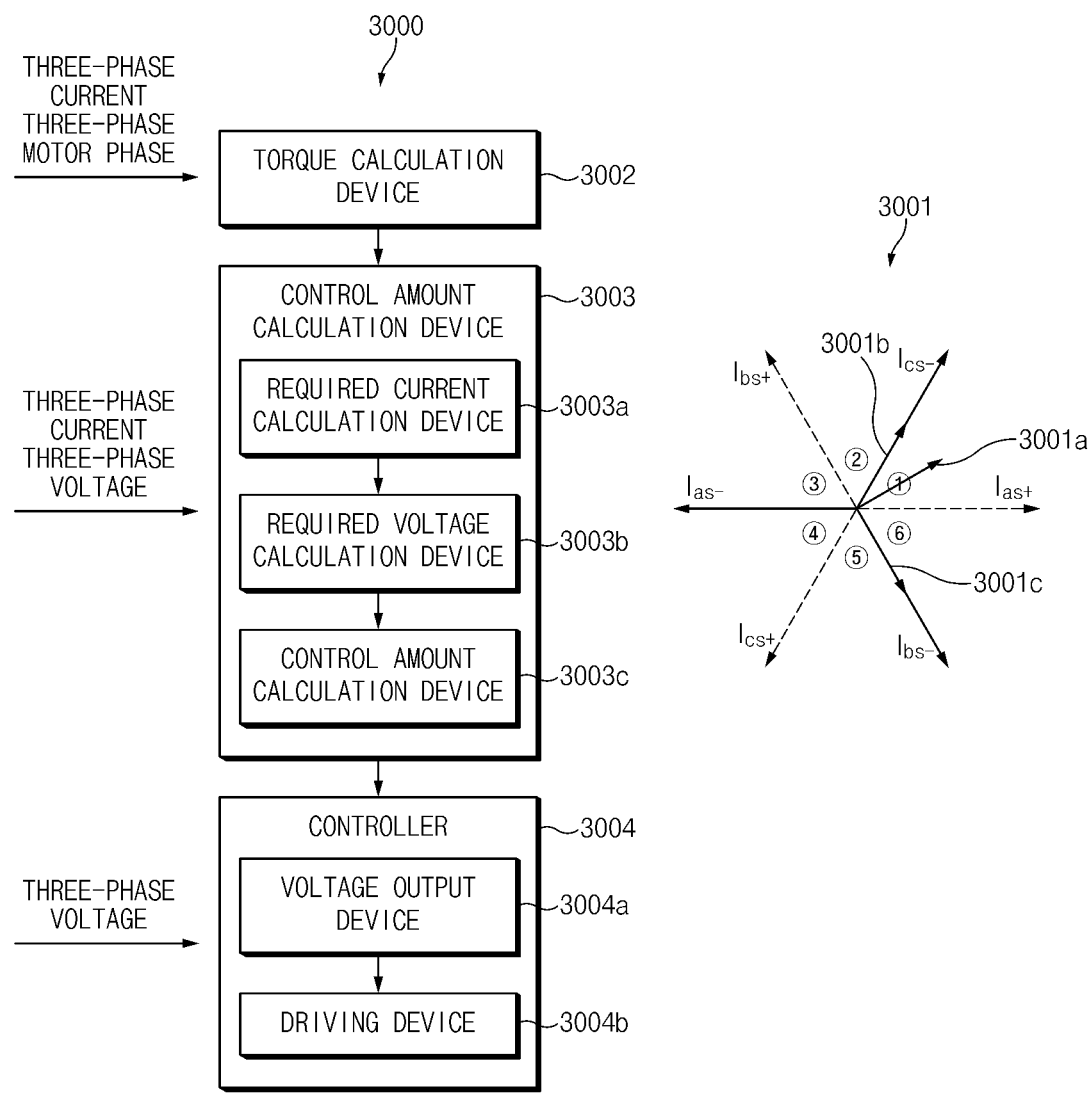
FIG. 3 is a view exemplarily illustrating a torque generation suppression process of an apparatus of suppressing torque generation of a three-phase motor according to an exemplary embodiment of the present disclosure.

FIG. 3 is a view exemplarily illustrating a torque generation suppression process of an apparatus of suppressing torque generation of a three-phase motor according to an exemplary embodiment of the present disclosure.

This figure illustrates a torque generation suppression process of an apparatus (the apparatus described in FIG. 1 and FIG. 2) for suppressing torque generation of a three-phase motor according to an exemplary embodiment of the present disclosure.

Reference numeral 3000 indicates a block diagram illustrating an example of an apparatus according to an exemplary embodiment of the present disclosure.

Referring to reference numeral 3000, an apparatus according to an exemplary embodiment of the present disclosure may include a torque determination device 3002, a control amount determination device 3003, and/or a controller 3004. Descriptions of the torque determination device, the control amount determination device, and the controller are the same as or similar to those described with reference to FIGS. 1 to 2.

As described above in FIG. 1 and FIG. 2, the torque determination device may determine the second torque value (the second torque value described in FIG. 2) by use of information related to the three-phase current, the phase of the three-phase motor, or the like.

As described above with reference to FIG. 1 and FIG. 2, the control amount determination device according to an exemplary embodiment of the present disclosure may determine a voltage control amount for generating the determined second torque value. The control amount determination device according to an exemplary embodiment of the present disclosure may include a required current determination device 3003a, a required voltage determination device 3003b, and/or a control amount determination device 3003c.

The required current determination device according to an exemplary embodiment of the present disclosure may determine a required current value for generating the determined second torque value. As described above with reference to FIG. 1 and FIG. 2, the second torque value may be generated by a current regenerated by the inverter. The above-described required current value may represent a current value required to generate the second torque value. The required current value according to an exemplary embodiment of the present disclosure may be expressed based on the d-q axis, and may include a d-axis required current value and a q-axis required current value.

The required voltage determination device according to an exemplary embodiment of the present disclosure may determine the required voltage value for generating the second torque value based on the required current value and the current three-phase current value (the three-phase current described in FIG. 1 and FIG. 2). The required voltage value according to an exemplary embodiment of the present disclosure may indicate a voltage value required for the inverter to generate the required current value. That is, a required current value is generated based on the required voltage value, and the three-phase motor is driven based on the required current value.

To generate the second torque value according to an exemplary embodiment in the three-phase motor, the three-phase current flowing in the three-phase motor has to be the above-described required current value. Accordingly, the required voltage value according to an exemplary embodiment of the present disclosure may represent a voltage value required for the three-phase motor (or inverter) for the current three-phase current value to be equal to the required current value. That is, the required voltage value may represent a voltage value for controlling the current three-phase current to follow the required current value. The required voltage value according to an exemplary embodiment of the present disclosure may be determined according to a proportional integral (PI) control scheme. In the instant case, the current three-phase current may be a measured value, and the determined required current value may be a target value.

The required voltage value according to the exemplary embodiments of the present disclosure may be expressed based on the d-q axis and include a d-axis required voltage value and a q-axis required voltage value. However, for the control amount determination device to determine the voltage control amount based on the required voltage value, the required voltage value may be expressed in a form of a three-phase voltage. According to an exemplary embodiment of the present disclosure, a scheme of expressing the required voltage value Vd* and/or Vq* in a three-phase voltage format Vdiff, a*, Vdiff,b* and/or Vdiff,c* may be as follows.

$$\begin{bmatrix} V^*_{diff,a} \\ V^*_{diff,b} \\ V^*_{diff,c} \end{bmatrix} = \begin{bmatrix} \cos\theta_r & -\sin\theta_r \\ \cos\left(\theta_r - \frac{2}{3}\pi\right) & -\sin\left(\theta_r - \frac{2}{3}\pi\right) \\ \cos\left(\theta_r + \frac{2}{3}\pi\right) & -\sin\left(\theta_r + \frac{2}{3}\pi\right) \end{bmatrix} \begin{bmatrix} V^*_d \\ V^*_q \end{bmatrix} \quad \text{[Equation 5]}$$

In Equation 5, Vd* and Vq* may represent a d-axis required voltage value and a q-axis required voltage value, respectively. Vdiff, a*, Vdiff,b* and Vdiff,c* may each represent a required voltage value expressed in a three-phase voltage format. According to an exemplary embodiment of the present disclosure, a scheme of expressing the required voltage value in a form of a three-phase voltage is not limited to the above-described equation.

The control amount determination device according to an exemplary embodiment of the present disclosure may determine the voltage control amount (the voltage control amount described above with reference to FIG. 1 and FIG. 2) based on the determined required voltage value. That is, the voltage control amount according to an exemplary embodiment of the present disclosure may represent a value based on a ratio of the required voltage value to the current three-phase voltage. For example, a scheme of obtaining a voltage control amount Ddiff* is as follows.

$$D_{diff}^* = V_{diff,abc}^* / V_{dc} \quad \text{[Equation 6]}$$

In Equation 6, Vdc may represent the current three-phase voltage of the three-phase motor described above. Vdiff, abc* may represent a required voltage value expressed in the above-described three-phase voltage format. The scheme of determining the voltage control amount according to an exemplary embodiment of the present disclosure is not limited to the above-described equation. That is, the voltage control amount according to an exemplary embodiment of the present disclosure may represent the ratio of the required voltage value to the current three-phase voltage of the three-phase motor.

The controller according to an exemplary embodiment of the present disclosure may include a voltage output device 3004a and/or an inverter 3004b.

The voltage output device according to an exemplary embodiment of the present disclosure may output a driving voltage for generating the second torque value based on the current three-phase voltage of the three-phase motor and the voltage control amount. For example, the voltage output device amplifies and outputs the current three-phase voltage by a value indicated by the voltage control amount.

An inverter according to an exemplary embodiment of the present disclosure may represent the inverter 1002 of FIG. 1 and/or the inverter 2002 of FIG. 2. That is, the inverter may be included in the apparatus according to an exemplary embodiment of the present disclosure. The apparatus according to an exemplary embodiment of the present disclosure may drive the three-phase motorbased on the output driving voltage. For example, the inverter may generate a three-phase current based on the driving voltage to generate torque to suppress unintended torque.

Reference numeral 3001 is a diagram for explaining a process of generating a three-phase current for suppressing unintentional torque by an inverter based on a driving voltage according to an exemplary embodiment of the present disclosure.

Referring to reference numeral 3001, Ias+ represents an a-phase current flowing from the inverter to the three-phase motor, Ibs+ represents a b-phase current flowing from the inverter to the three-phase motor, Iac+ represents a c-phase current flowing from the inverter to the three-phase motor, Ias− represents an a-phase current flowing from the three-phase motor to the inverter, Ibs− represents a b-phase current flowing from the three-phase motor to the inverter, and Ics− represents a c-phase current flowing from the three-phase motor to the inverter.

The inverter according to an exemplary embodiment of the present disclosure may generate a three-phase current for suppressing the above-described unintended torque by use of two currents among the a-phase current to the b-phase current. For example, when the phase of the three-phase current to be generated is located in a first zone 3001a, the inverter may generate the three-phase current by use of Ics− 3001b and Ibs− 3001c. The current(s) used by the inverter according to an exemplary embodiment of the present disclosure may be controlled based on one or more switches.

The apparatus according to an exemplary embodiment of the present disclosure may suppress the unintentional torque generation in the three-phase motor through the scheme described in the present figure. Furthermore, the apparatus according to an exemplary embodiment of the present disclosure may determine and generate a voltage configured for suppressing the torque caused by the zero phase sequence component current in the three-phase motor to drive the three-phase motor. Thus, the apparatus may suppress unintentional torque generation in the charging system using a motor, increasing the efficiency of the charging system.

Figure 4:
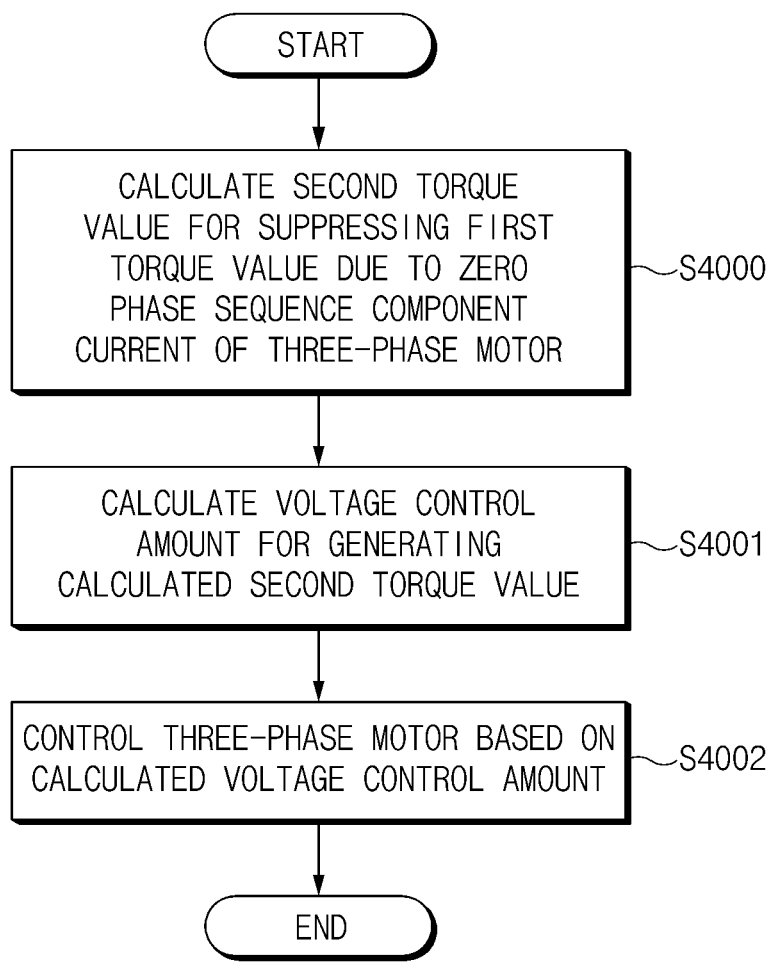
FIG. 4 is a flowchart illustrating an example of a method of suppressing torque generation of a three-phase motor according to an exemplary embodiment of the present disclosure.

FIG. 4 is a flowchart illustrating an example of a method of suppressing torque generation of a three-phase motor according to an exemplary embodiment of the present disclosure.

This figure is a flowchart illustrating an example of a method of suppressing torque generation of a three-phase motor according to an exemplary embodiment of the present disclosure. The apparatus described in FIG. 1, FIG. 2, and FIG. 3 may perform the method described in the present figure.

According to an exemplary embodiment of the present disclosure, the method may include determining the second torque value for suppressing the first torque value due to the zero phase sequence component current of the three-phase motor in S4000, determining the voltage control amount for generating the determined second torque value in S4001, and/or controlling the three-phase motor based on the determined voltage control amount in S4002. The method according to an exemplary embodiment of the present disclosure may further include one or more operations not shown in the present figure.

According to an exemplary embodiment of the present disclosure, S4000 to S4002 may be performed by the apparatus of suppressing torque generation of a three-phase motor described above with reference to FIG. 1, FIG. 2, and FIG. 3.

S4000 according to an exemplary embodiment of the present disclosure may be performed by the torque determination device 2003 described above in FIG. 2. According to an exemplary embodiment of the present disclosure, S4000 may include determining the zero phase sequence component current value based on the current three-phase current value of the three-phase motor, determining the first torque value due to the zero phase sequence component current based on the determined zero phase sequence component current value, and/or determining the second torque value for suppressing the first torque value based on the determined first torque value. Descriptions of the above-described operations are the same as or similar to those described above with reference to FIG. 2 and FIG. 3.

The zero phase sequence component current value according to an exemplary embodiment of the present disclosure may be expressed based on a d-q axis, and the zero phase sequence component current value may include a d-axis zero phase sequence component current value and a q-axis zero phase sequence component current value. Descriptions of the zero phase sequence component current value, the d-axis zero phase sequence component current value, and the q-axis zero phase sequence component current value are the same as or similar to those described above with reference to FIG. 2 and FIG. 3.

According to an exemplary embodiment of the present disclosure, S4001 may include determining a required current value for generation of the determined second torque value, determining a required voltage value for generating the second torque value based on the determined required current value and the current three-phase current value, and/or determining the voltage control amount based on the determined required voltage value. Descriptions of the first torque value and the second torque value are the same as or similar to those described above with reference to FIG. 1, FIG. 2, and FIG. 3. Descriptions of the above-described operations are the same as or similar to those described above with reference to FIG. 2 and FIG. 3.

The required current value and the required voltage value according to an exemplary embodiment of the present disclosure may be expressed based on the d-q axis. The required current value may include a d-axis required current value and a q-axis required current value. The required voltage value may include a d-axis required voltage value and a q-axis required voltage value. Descriptions of the required current value and the required voltage value according to an exemplary embodiment are the same as or similar to those described above with reference to FIG. 1, FIG. 2, and FIG. 3.

The current three-phase current value according to an exemplary embodiment of the present disclosure may be expressed based on a d-q axis. The required voltage value according to an exemplary embodiment of the present disclosure may indicate a voltage value required for the three-phase motor so that the current three-phase current value is equal to the required current value. Descriptions of the current three-phase current value and the required voltage value according to an exemplary embodiment are the same as or similar to those described above with reference to FIG. 2 and FIG. 3.

The voltage value required for the three-phase motor configured for the current three-phase current value to be equal to the required current value according to an exemplary embodiment of the present disclosure may be determined based on the PI control scheme. Description of the above-described required voltage value is the same as or similar to that described above with reference to FIG. 2 and FIG. 3.

The voltage control amount according to an exemplary embodiment of the present disclosure may represent a value based on a ratio of the required voltage value to the current three-phase voltage of the three-phase motor. The description of the voltage control amount according to an exemplary embodiment of the present disclosure is the same as or similar to that described above with reference to FIG. 2 and FIG. 3.

According to an exemplary embodiment of the present disclosure, S4002 may include outputting a driving voltage for generating the second torque value based on the current three-phase voltage of the three-phase motor and the voltage control amount, and/or driving the three-phase motor based on the output driving voltage. Descriptions of the above-described operations are the same as or similar to those described above with reference to FIG. 2 and FIG. 3.

According to the embodiments, it is possible to suppress the unintended torque from being induced in the three-phase motor.

Furthermore, according to the embodiments, it is possible to suppress the torque due to the zero phase sequence component current of the three-phase motor.

Furthermore, various effects that are directly or indirectly understood through the present disclosure may be provided.

The above description is a simple exemplification of the technical spirit of the present disclosure, and the present disclosure may be variously corrected and modified by those skilled in the art to which the present disclosure pertains without departing from the essential features of the present disclosure.

Furthermore, the term related to a control device such as "controller", "control apparatus", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain predetermined principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus of suppressing torque generation of a three-phase motor, the apparatus comprising:
a torque determination device configured to determine a second torque value for suppressing a first torque value due to a zero phase sequence component current of the three-phase motor;
a control amount determination device configured to determine a voltage control amount for generating the determined second torque value;
a required current determination device configured to determine a required current value expressed based on a d-q axis for generating the determined second torque value;

a required voltage determination device configured to determine a required voltage value expressed based on the d-q axis for generating the second torque value based on the determined required current value and the three-phase current value; and a controller configured to control the three-phase motor according to the determined voltage control amount, wherein the torque determination device is configured to determine the first torque value based on zero phase sequence component flux of the three-phase motor, n-phase sequence component current value, and phase angle of the three-phase motor.

2. The apparatus of claim 1, wherein the zero phase sequence component current value is expressed based on the d-q axis, and wherein the zero phase sequence component current value includes a d-axis zero phase sequence component current value and a q-axis zero phase sequence component current value.

3. The apparatus of claim 1, wherein the control amount determination device includes:

a control amount determination device configured to determine the voltage control amount based on the determined required voltage value.

4. The apparatus of claim 3, wherein the required current value includes a d-axis required current value and a q-axis required current value, and wherein the required voltage value includes a d-axis required voltage value and a q-axis required voltage value.

5. The apparatus of claim 4, wherein the current three-phase current value is expressed based on the d-q axis, and wherein the required voltage value represents a voltage value required for the three-phase motor so that the current three-phase current value is equal to the required current value.

6. The apparatus of claim 5, wherein the voltage value required for the three-phase motor so that the three-phase current value is equal to the required current value is determined according to a proportional integral (PI) control scheme.

7. The apparatus of claim 3, wherein the voltage control amount represents a value based on a ratio of the required voltage value to a current three-phase voltage of the three-phase motor.

8. The apparatus of claim 3, wherein the controller includes:

a voltage output device configured to output a driving voltage for generating the second torque value based on a current three-phase voltage of the three-phase motor and the voltage control amount.

9. The apparatus of claim 8, wherein the controller further includes:

an inverter configured to drive the three-phase motor based on the output driving voltage.

10. A method of suppressing torque generation of a three-phase motor, the method comprising:

determining, by a torque determination device, a second torque value for suppressing a first torque value due to a zero phase sequence component current of the three-phase motor;

determining, by a control amount determination device, a voltage control amount for generating the determined second torque value;

determining, by a required current determination device, a required current value expressed based on a d-q axis for generating the determined second torque value;

determining, a required voltage determination device, a required voltage value expressed based on the d-q axis for generating the second torque value based on the determined required current value and the three-phase current value; and controlling, by a controller, the three-phase motor according to the determined voltage control amount, wherein the torque determination device configured to determine the first torque value based on zero phase sequence component flux of the three-phase motor, n-phase sequence component current value, and phase angle of the three-phase motor.

11. The method of claim 10, wherein the zero phase sequence component current value is expressed based on the d-q axis, and wherein the zero phase sequence component current value includes a d-axis zero phase sequence component current value and a q-axis zero phase sequence component current value.

12. The method of claim 10, wherein the determining of the voltage control amount includes:

determined required current value and the current three phase current value; and determining the voltage control amount based on the determined required voltage value.

13. The method of claim 12, wherein the required current value includes a d-axis required current value and a q-axis required current value, and wherein the required voltage value includes a d-axis required voltage value and a q-axis required voltage value.

14. The method of claim 13, wherein the current three-phase current value is expressed based on the d-q axis, and wherein the required voltage value represents a voltage value required for the three-phase motor so that the current three-phase current value is equal to the required current value.

15. The method of claim 14, wherein the voltage value required for the three-phase motor so that the current three-phase current value is equal to the required current value is determined according to a proportional integral (PI) control scheme.

16. The method of claim 12, wherein the voltage control amount represents a value based on a ratio of the required voltage value to a current three-phase voltage of the three-phase motor.

17. The method of claim 12, wherein the controlling of the three-phase motor includes:

outputting a driving voltage for generating the second torque value based on a current three-phase voltage of the three-phase motor and the voltage control amount.

18. The method of claim 17, wherein the controlling of the three-phase motor includes:

driving the three-phase motor based on the output driving voltage.

* * * * *